US008849754B2

(12) United States Patent
Craggs (10) Patent No.: US 8,849,754 B2
(45) Date of Patent: Sep. 30, 2014

(54) MANAGING TOPICAL OVERLAP DURING PUBLICATION AND SUBSCRIPTION (75) Inventor: Ian Gerald Craggs, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 2072 days.

(21) Appl. No.: 11/550,106

(22) Filed: Oct. 17, 2006

(65) Prior Publication Data

US 2007/0088711 A1 Apr. 19, 2007

(30) Foreign Application Priority Data

Oct. 19, 2005 (GB) .................................. 0521355.8

(51) Int. Cl.
*G06F 17/30* (2006.01)
*G06Q 10/10* (2012.01)

(52) U.S. Cl.
CPC ..................................... *G06Q 10/10* (2013.01)
USPC ........................................ 707/628; 707/632

(58) Field of Classification Search
CPC .................................................. G06F 17/3089
USPC .................................................. 707/628, 632
See application file for complete search history.

(56) References Cited

U.S. PATENT DOCUMENTS

| | | | | | |
|---|---|---|---|---|---|
| 6,073,165 | A | * | 6/2000 | Narasimhan et al. | 709/206 |
| 6,633,630 | B1 | * | 10/2003 | Owens et al. | 379/93.24 |
| 6,989,765 | B2 | * | 1/2006 | Gueziec | 340/905 |
| 7,349,980 | B1 | * | 3/2008 | Darugar et al. | 709/238 |
| 7,680,951 | B1 | * | 3/2010 | Kulik | 709/238 |
| 7,685,265 | B1 | * | 3/2010 | Nguyen et al. | 709/223 |
| 2003/0135556 | A1 | * | 7/2003 | Holdsworth | 709/206 |
| 2005/0021843 | A1 | | 1/2005 | Duigenan et al. | 709/238 |
| 2005/0114760 | A1 | * | 5/2005 | Arregui et al. | 715/513 |
| 2006/0047666 | A1 | * | 3/2006 | Bedi et al. | 707/10 |

(Continued)

FOREIGN PATENT DOCUMENTS

| | | | | |
|---|---|---|---|---|
| EP | 1435710 A2 | * | 7/2004 | G06F 17/60 |
| GB | 2354913 A | * | 4/2001 | G06F 17/30 |
| GB | 0305066.3 | * | 9/2004 | |
| WO | WO2004080030 | * | 9/2004 | G06F 15/16 |

OTHER PUBLICATIONS

Eugster et al, "The many faces of publish/subscribe", Jun. 2003, ACM Computing Surveys (CSUR) ACM Press, vol. 35, Issue 2, p. 114-131.*

(Continued)

*Primary Examiner* — Khanh Pham
(74) *Attorney, Agent, or Firm* — Cuenot, Forsythe & Kim, LLC (57) ABSTRACT

In a publish/subscribe system, a plurality of publishers provide information on a range of topics and a plurality of subscribers subscribe to one or more topics and topic sets on which they wish to receive information. Subscribers can also unsubscribe from topics and topic sets on which they do not wish to receive information. A subscription matcher such as a message broker is used to generate a subscription list of topic and topic set identifiers—from both the subscribe and unsubscribe requests of each subscriber. The subscription matcher then matches items of information from each publisher with topics and topic set definitions in the subscription list of each subscriber, and distributes matched items of information in accordance with subscription lists. The subscription matcher determines precedence between any overlapping subscribed and unsubscribed topics and topic sets based on the sequence in which they were stored.

21 Claims, 8 Drawing Sheets

(56) References Cited

U.S. PATENT DOCUMENTS

| | | | |
|---|---|---|---|
| 2006/0149840 A1* | 7/2006 | Thompson et al. | 709/224 |
| 2006/0155578 A1* | 7/2006 | Eisenberger et al. | 705/2 |
| 2006/0168070 A1* | 7/2006 | Thompson et al. | 709/206 |
| 2006/0224624 A1* | 10/2006 | Korn et al. | 707/104.1 |
| 2007/0067389 A1* | 3/2007 | Bedi et al. | 709/204 |
| 2007/0078708 A1* | 4/2007 | Yu et al. | 705/14 |
| 2008/0107272 A1* | 5/2008 | Carmeli et al. | 380/278 |
| 2008/0126476 A1* | 5/2008 | Nicholas et al. | 709/203 |

OTHER PUBLICATIONS

Leung et al, "Efficient Matching for State-Persistent Publish/Subscribe Systems", Oct. 6, 2003, Proceedings of the 2003 Conference of the Centre for Advanced Studies on Collaborative Research, p. 182-196, <Retrieved from ACM Portal Jul. 17, 2008>.*

EPO, IPER Ch.2 and Written Opinion for PCT/GB2004/000611, Aug. 10, 2005.*

Graham et al., "Publish-Subscribe Notification for Web Services", Mar. 5, 2004, IBM, Sonic Software, TIBCO, Akamai, SAP AG, Computer Associates, Fujitsu Laboratories of Europe, Argonne National Laboratory, Hewlett-Packard, p. 1-19. <Retrieved from www.ibm.com/developerworks/library/ws-pubsub/WS-PubSub.pdf on Aug. 24, 2008>.*

* cited by examiner

| Diagram | Operation | Stored Expression |
|---|---|---|
| (a/#) | Subscribe a/# | a |
| (a/#)(#/a) | Subscribe #/a | a/# + #/a |
| (a/b (a/#))(#/a) | Subscribe a/b | a/# + #/a (a/b is discarded) |
| ((a/#)(# (#/a))) | Subscribe # | # (a/# and #/a are discarded) |

MANAGING TOPICAL OVERLAP DURING PUBLICATION AND SUBSCRIPTION

FIELD OF THE INVENTION

The invention relates to a publish/subscribe system, such as a data processing system running a publish/subscribe message broker, and to a method for managing subscriptions and unsubscribe requests in such a system.

BACKGROUND OF THE INVENTION

A "publish/subscribe" communication system is a type of messaging application in which the, providers of information (publishers) are decoupled from the consumers of that information (subscribers) by means of an intermediate broker or other system component that implements subscription matching to identify information that is of interest to a particular subscriber. Subscriptions may specify topic names of interest, or may specify which information content is of interest. Typically, in a topic-based publish/subscribe messaging system, a number of publishers publish messages to a message broker on particular topics (e.g. news, weather, sport). Subscribers register their interest in such topics via subscription requests received at the broker. For example, a subscriber may be an application program or system that requests all request to receive any information published on the topic *weather', whilst another subscriber may desire information on the topics 'news' and 'sport'. Publishers do not need to be concerned with where their publications are going, and subscribers do not need to know where the messages they receive have come from. Instead, the broker manages the distribution of the messages to make sure that they arrive at the correct destination according to the valid subscriptions registered in the broker. The broker also ensures that messages are distributed in the correct format, and validates the authority of each publisher to publish to the subscribers which have subscribed to the particular topic encompassing the message.

In general terms, a publisher generates a message that it wants to publish and defines the topic of the message. The broker retrieves the message from its input node and passes it to a publication node for distribution to all subscribers that have registered an interest. Distribution of messages to subscribers may either be by point-to-point broadcast from the broker or may be by multi-casting. In the latter case, in order to reduce network traffic, messages on particular topics may be distributed to intermediate shared addresses which are provided to all the subscribers that have registered an interest in the particular topic so that they can listen in for newly published information.

Another approach to publish/subscribe communications employs a client-side subscription-matching component. That is, all publications from approved publishers are transmitted to each system running one or more subscriber applications. A component associated with the local subscriber application(s) determines which publications to delete (because they are of no interest to local subscribers) and which to pass to the local subscriber application(s).

In order to facilitate the identification of topics of interest with greater precision, specific topic syntaxes have been developed which are multi level and which permit the use of wildcards. In this way carefully defined sets of related topics can be covered by a single subscription.

One known publish/subscribe system of this type is further described in a document entitled "Publish/Subscribe" (Third Edition, February 2005) in the documentation library of the product WebSphere Business Integration Message Broker V5.0 from International Business Machines Corporation ("WebSphere" is a trademark of International Business Machines Corporation).

In this document, it is explained that a "topic" may be any character string that describes the nature of the data that is published in a publish/subscribe system. Topics are key to the successful delivery of messages. Instead of including a specific destination address in each message, a publisher assigns topics to the message. The broker matches the topic with a list of clients (subscribers) who have subscribed to that topic and delivers the message to each of those clients. Topics can be defined by a system administrator in advance but can also be defined when specified in a publication for the first time.

Each topic defined becomes an element, or node, in a topic tree. The resulting tree is usually a hierarchical (multi-level) structure with one or more root topics. The nodes are identified by name and are combinable to define a narrower topic by specifying the names of nodes on successive levels of the hierarchy. The levels may be separated by the slash "/" character.

In the syntax employed in some products, publish/subscribe topics are thus identified by any character strings, separated by slashes. In addition to the slash "/", special meaning also applies to the plus "+" and the hash "#" (also referred to as the pound sign in the US), which signify different types of wildcards. These special characters will now be discussed in more detail with the use of examples.

The slash character ("/") denotes partitions within a topic name which are interpreted as levels in a tree, as explained above. For example "employee/hire/development" is a topic name with three levels indicating only information about employees hired within the development function. The slashes are used to define a hierarchy in the topic namespace. There is no limit to the number of levels in a topic tree and there may be any number of root nodes (that is, any number of topic trees).

For greater flexibility, the hash character ("#"), is defined as a wildcard character which can match any number of partitions. Although some implementations allow use of the hash character only at the beginning or the end of a topic, this rule may not apply in other cases. Thus a subscription to "employee/#" will receive all messages with the subjects "employee/hire" and "employee/hire/development". Because of this, the hash wildcard is called the multi-level wildcard. Since the semantics of the # wildcard are that it can match zero or more partitions, "employee/#" can also match just "employee" (but in this case, the slash is meaningless, since there is no partition to separate). Typically, the multi-level wildcard is used to match a sub-tree of unknown depth. By preceding "employee" with "#/", that is "#/employee" other multi-level topic strings which happen to contain bottom level references to "employee", such as "development/employee" will match.

The second type of wildcard is the plus "+". It is called the single level wildcard since it will only match a single partition. For example, "employee/+" will match "employee/hire" but not "employee/hire/development". Nor does it match "employee" alone as there must be a second level name in the topic.

In the above-described syntax, sets of topics can only be defined with the use of one or more wildcards of either type. In the absence of wildcards, different topics are specific and non-overlapping so that, using the examples above, the topic "employee" does not include the topic "employee/hire" and only contains items with a single top level reference to "employee". Similarly, the second level topic "employee/hire" is distinct from the third level topic "employee/hire/ development". The topics do not overlap and thus are not subsets or supersets of each other.

The use of wildcards in topic definitions is restricted to subscribers. Publishers can only publish information (a "publication") on discrete topics, which must be identified to the broker in a publish command also containing the publication itself. Subscribers, by contrast, can send subscription requests to a broker using topic sets defined by means of wildcards. As used hereafter, the term "topic set" will refer to a superset of any mixture of discrete topics and other topic sets.

Another optional feature available to subscribers is the filter. A filter is an expression, which might also include wildcards, that is applied to the content (as opposed to the topic definition) of a publication message to determine whether it matches the subscription. When a subscription is registered with the broker, in addition to specifying a topic and destination, a filter may be specified to further refine the selection of publications according to their contents. It is even possible to select publications using only filters by specifying # alone (equivalent to "all topics") in the topic field. However, this may result in excessive network traffic as all messages arrive at the broker.

Another aspect of publish/subscribe is that subscribers must be free to alter their subscriptions and so a deregistration, or "unsubscribe", request function is provided. Conventionally, this is only permitted to remove a topic from the subscription list of a subscriber if the unsubscribed topic is identical with one in the list. This keeps the list as a wholly positive list of topics of interest which can easily be tested for matches with subsequently applied publication topics. If the unsubscribe request is not identical to a listed topic for that client, it is ignored. Subscription lists can become quite long and a query facility, even if provided, requires substantial operator involvement. For these reasons, managing the list to ensure that only information of current interest is being subscribed to can become a problem.

This situation is particularly a problem where the topic set of interest is a high level one with many potential subtopics such as may be defined using wildcards, particularly multi level wildcards. This is because attempting to unsubscribe to anything less than the complete topic set will fail. This lack of flexibility is a hindrance to efficient and targeted use of publish/subscribe techniques as it would require the subscriber to re-subscribe to a large and ill defined number of lower level topics. Although the use of filters does allow subscribers to further restrict messages received, this is effected only by applying a structured query to the actual message content, involving additional computation. Substantial operator involvement in the additional query process is again required. Also, as has already been noted, the broad use of wildcards and reliance on filters can still result in excess network traffic.

Publish/subscribe communications have proven well suited to message-oriented middleware products and messaging environments in which a subscription matcher component determines which published messages should be passed to specific subscribers. As mentioned above, the subscription matcher may be local to each subscriber, or may be a message broker or network of brokers located at an intermediate node or set of nodes in a network—between publishers and subscribers. Publish/subscribe solutions are also achieving increasing acceptance for Web Services notifications.

It is recognized that it is desirable to be able to effectively exclude, at the subscription/unsubscription stage, a portion of a broadly defined set of topics without removing the broad definition itself. In addition to this particular problem of broad topic set definition, it is also generally desirable that arbitrary unsubscribing and indeed subscribing to additional topics should work more efficiently.

SUMMARY OF THE INVENTION

The invention is employed for managing subscriptions to topics and topic sets in a publish/subscribe system in which subscriptions indicate information topics of interest to subscribers and are used to identify published information that should be passed to subscribers. In response to a subscriber's subscribe request identifying a first topic or topic set, an identifier of the first topic or topic set is stored as a positive subscription. In response to an unsubscribe request for the subscriber, which unsubscribe request identifies a second topic or topic set that comprises a partial overlap of the identified topic or topic set of the positive subscription, an identifier of the second topic or topic set is stored as a negative subscription. The system compares topics of received publications with stored identifiers of topics and topic sets of both the positive and negative subscriptions to determine which publications should be passed to the subscriber.

It should be noted that publishers and subscribers may also interact with a network of brokers, each one of which propagates subscriptions and forwards publications to other brokers within the network. Therefore, when the term 'broker" is used herein it should be taken as encompassing a single broker or multiple brokers working together as a network to provide brokering services.

It should also be noted that publish/subscribe is not only used in purely messaging systems but may be used in, for example, event handling features of transaction processing systems. However, it is the messaging type of system in which the subscribers are client computers or terminals operated by human users that are of most interest in the present case.

BRIEF DESCRIPTION OF THE DRAWINGS

The invention is described below in more detail, by way of example only, with reference to preferred embodiments thereof as illustrated in the accompanying drawings, in which.

DETAILED DESCRIPTION OF THE INVENTION

Figure 1:
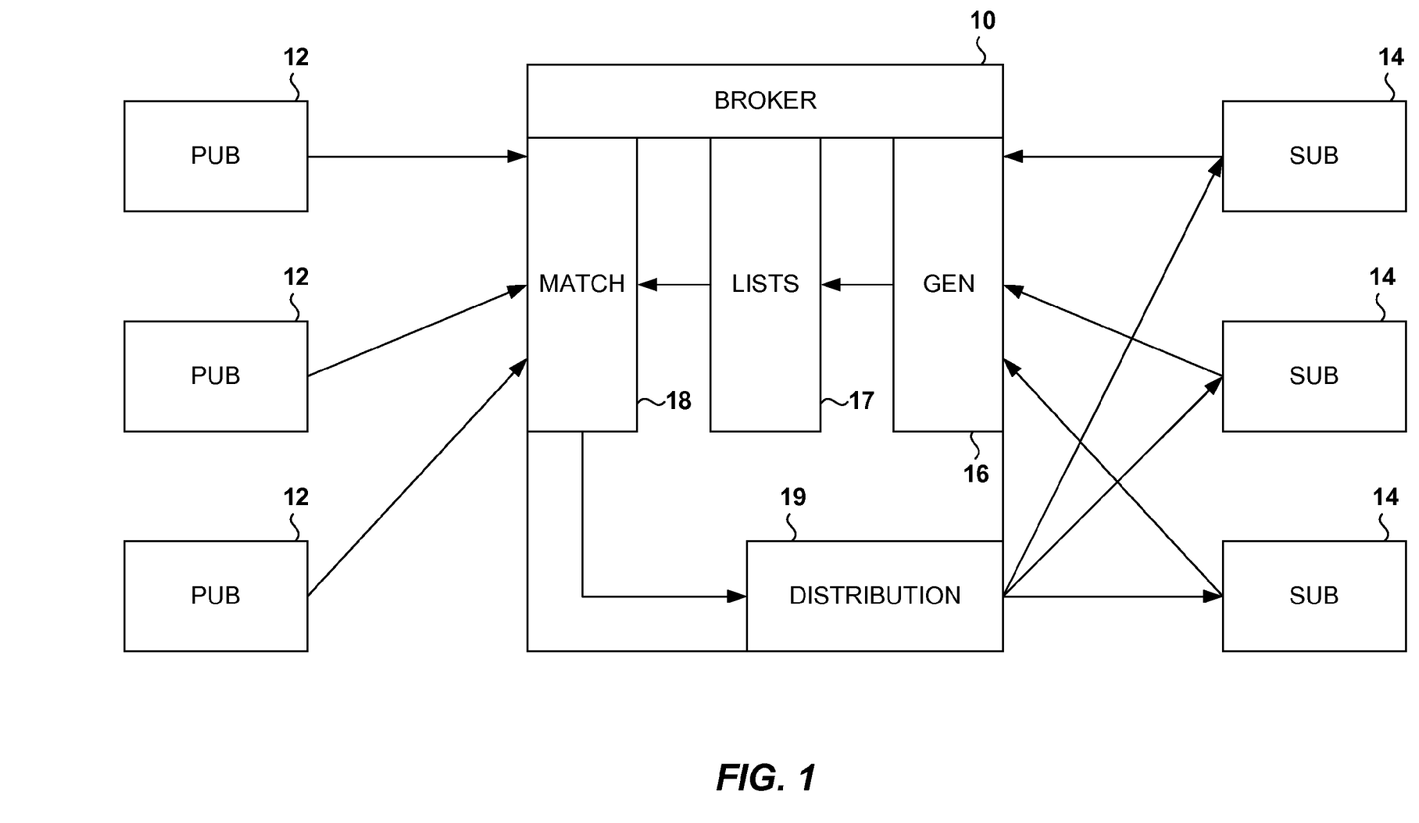
FIG. 1 is a diagrammatic overview of a conventional publish/subscribe system including a broker such as may implement the present invention.

In FIG. 1 there is shown a block diagram of a publish/subscribe system including a message broker 10. The illustration is general and describes a message broker in which the present invention may be implemented.

Also illustrated are a number of publishers 12, which are data sources, such as computer based commercial data bases.

These supply items of information, normally referred to as "publications" to the broker 10. A publication includes not only the information content but also the name of the publication topic in a syntax recognisable by the broker. Publishers effectively supply publications at random times to the broker.

As discussed above, topic definitions can be refined and made more specific by the use of the separator "/" to produce a multi level topic which can be thought of as a node of a topic tree.

Also connected to the broker 12 are a number of subscribers 14, which are client computers such as terminals or internet connected personal computers through which human operators submit requests to be supplied with publications on selected topics by the broker. With one important difference, subscribers employ the same syntax as the publishers to define topics of interest. The difference is that subscribers can include wildcards in their subscription requests. In the present example, it is assumed that the multi level hash wildcard "#" and single level wildcard *+*, as described above are available. Use of these wildcards enables the subscribers to request information on a set of topics and not just on a discrete topic. Of course, subscribers can make more than one subscription request in order to register interest in a number of discrete topics or other topic sets at the same time.

Subscribers 14 supply the topic or topic set names in which they are interested to the broker 10 on logical connections 15 and list generation software 16 in the broker assembles the requests from each subscriber into subscription lists 17 which are stored in the broker. Match software 18 compares each new publish message from publishers 12 with the stored subscription lists 17 for each subscriber and, if they match, causes distribution software 19 to distribute the matched publication over logical connections 20 to those subscribers which have requested the topic of the publication.

For a publication to match a subscribe request in a subscription list, it must be identical to a discrete subscribed topic or included in a set of topics defined in the subscription list possibly by the use of wildcards. Examples of this will be given below.

It will be realised that FIG. 1 shows a simplified system assuming, for ease of explanation, a single broker in point-to-point communication with subscribers but the system could equally well have been a collection of brokers in a network, distributing publications by multicasting, for example, rather than simple broadcasting.

As has already been explained above, one problem with conventional systems has been that the facility for a subscriber to unsubscribe (deregister) from an existing subscription is relatively limited. Topics or named topic sets can only be removed from the subscription list if they are specified exactly by the unsubscribe request. Otherwise, the request is ignored. It has not hitherto been possible to unsubscribe partially from a discrete subscription in a subscription list.

A method of allowing partial unsubscription in the system of FIG. 1 will now be described. However, in order to do this it is first necessary to describe two functions: topicIncludes(x,y) and topicOverlaps(x,y) which are employed in the method of the invention.

Figure 2:
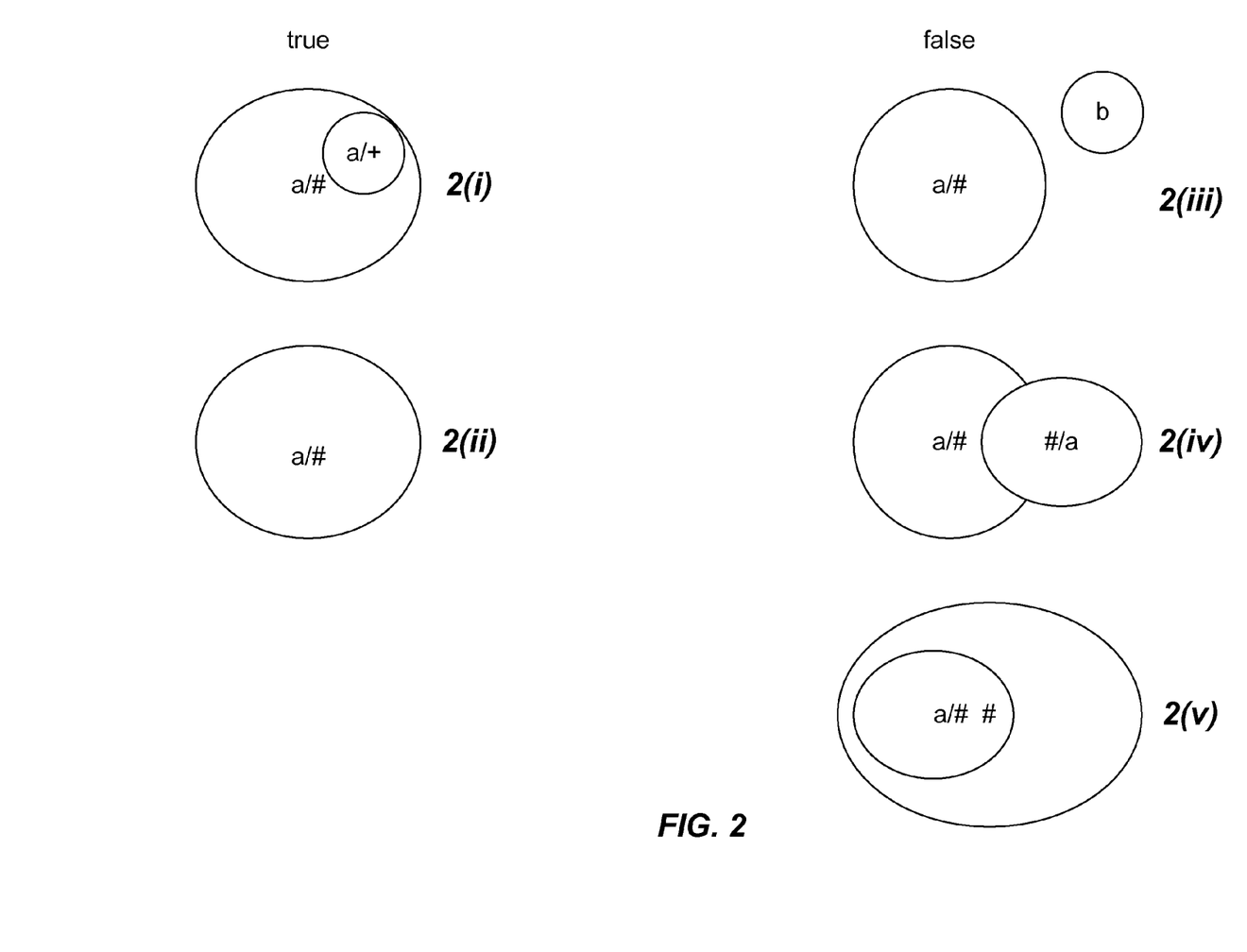
FIG. 2 shows examples of the results from a function topicIncludes(x,y) used in an implementation of the method of the present invention.

The function topicIncludes(x,y) simply produces a true or false output according to whether y is equal to or a subset of x. Some examples, mainly of topic sets, are shown in FIG. 2, the topic or topic set names being positioned at the centre of the Venn diagram circles or ellipses representing them. The y topics and topic sets are shown shaded in order to distinguish them from the x topic sets. Although two discrete topics can be equal, it is only possible, in the syntax described above, for "x" to be a superset if it includes wildcards. Thus, in examples 2(i) to 2(v), the x topic is the set "a/#", that is all topics with "a" as the first level. This set clearly includes the subset "a/+" in example 2(i) and includes (in fact equals) itself "a/#" in example 2(ii), both of which are therefore "true". The set "a/#" does not however include the disjoint discrete topic "b" in example 2(iii) or the overlapping but not included set "#/a" in example 2(iv). Nor does it include the set of all topics "#", which is a superset not a subset.

The function topicOverlaps(x,y) determines whether the intersection of x and y is not null. Some examples are shown in FIG. 3 where, again, the topic and set names are at the centre of their respective Venn circles and ellipses. In the examples shown, the x topic is assumed to be always the topic set "a/+". in example 3(i) it can be seen that this overlaps the set "+/a", the overlap topic being "a/a" indicated by the shaded area, so the output of the function is "true". In example 3(ii), the discrete topic "a/b" is wholly included in the set "a/+" so again the output is "true". In example 3(iii), the set "a/+" is itself wholly included in the superset "a/#" so this output is also true. Only in example 3(iv) where the sets "a/+" and *b/# are disjoint, is the output false. It may be noted that partial overlap as opposed to inclusion can only occur when both x and y are topic sets, and neither is a discrete topic.

Figure 3:
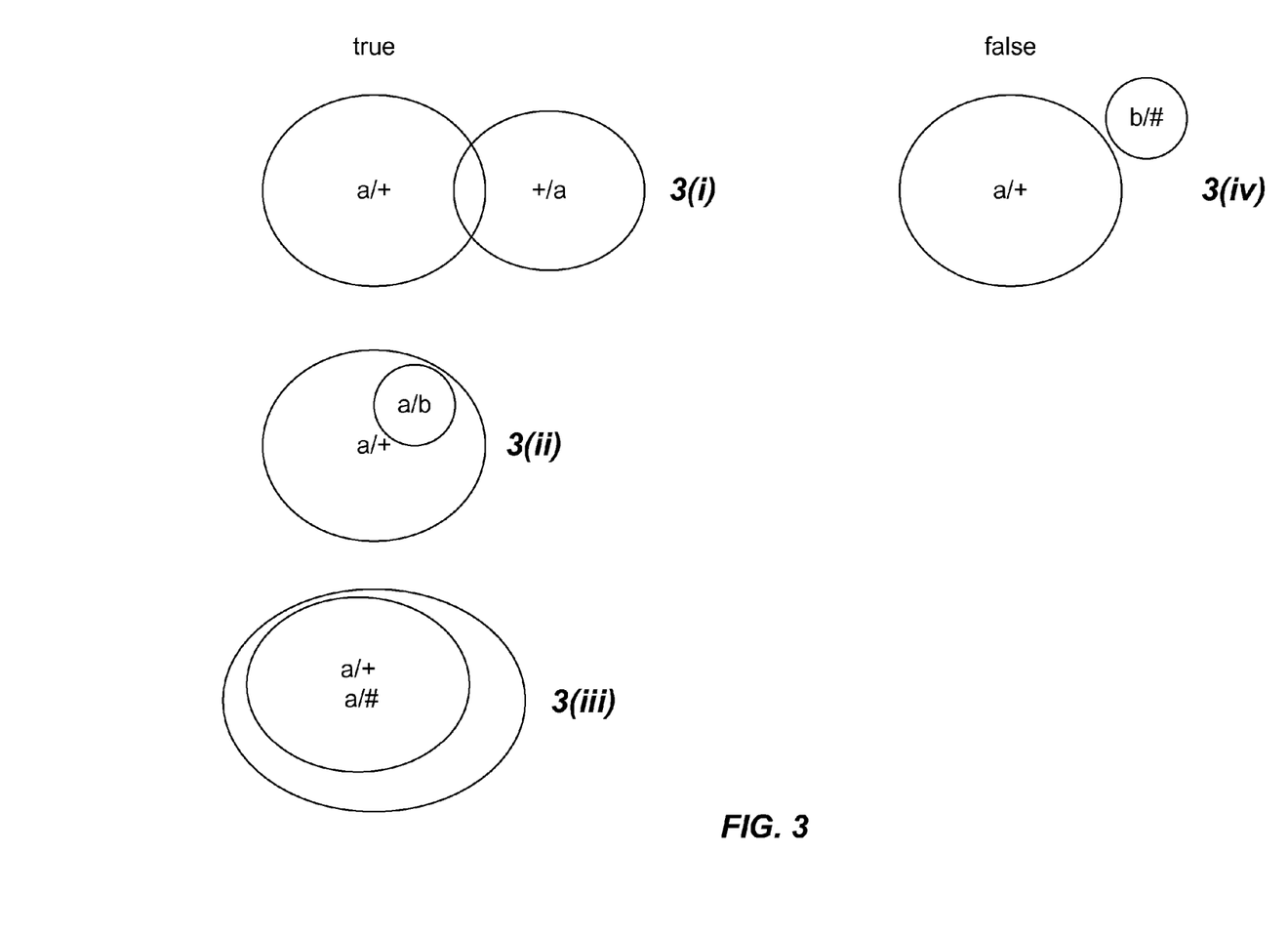
FIG. 3 shows examples of the results from a function topicOverlaps(x,y) used in an implementation of the method of the present invention.

In order to evaluate the function topicOverlaps(x,y), for any two given topic sets, a representative example is constructed out of the two topic patterns. If this example matches both topic sets, then they overlap. To determine a match, the function topicIncludes(x,y) is applied. The algorithm for constructing the example is as follows:

1) For parameters topic1 and topic2, construct a general example for topic2;
2) For each level in topic2
if the current level is "+":
if we have a corresponding level in topic1 and it is not a wildcard (+ or #) add the topic level to the example otherwise use an arbitrary matching string ("XXX");
else if the current level is not "#":
add the current topic2 level to the example;
if the first level in the current topic list is "+" or the same as the current topic2 level remove the first level in the topic list;
3) Compare the generated example with topic1 using the established matching routine, topicIncludes(x,y) to indicate whether topic1 and topic2 overlap:
if the example matches topic1, return the output "true";
else return the output "false".

Figure 4:
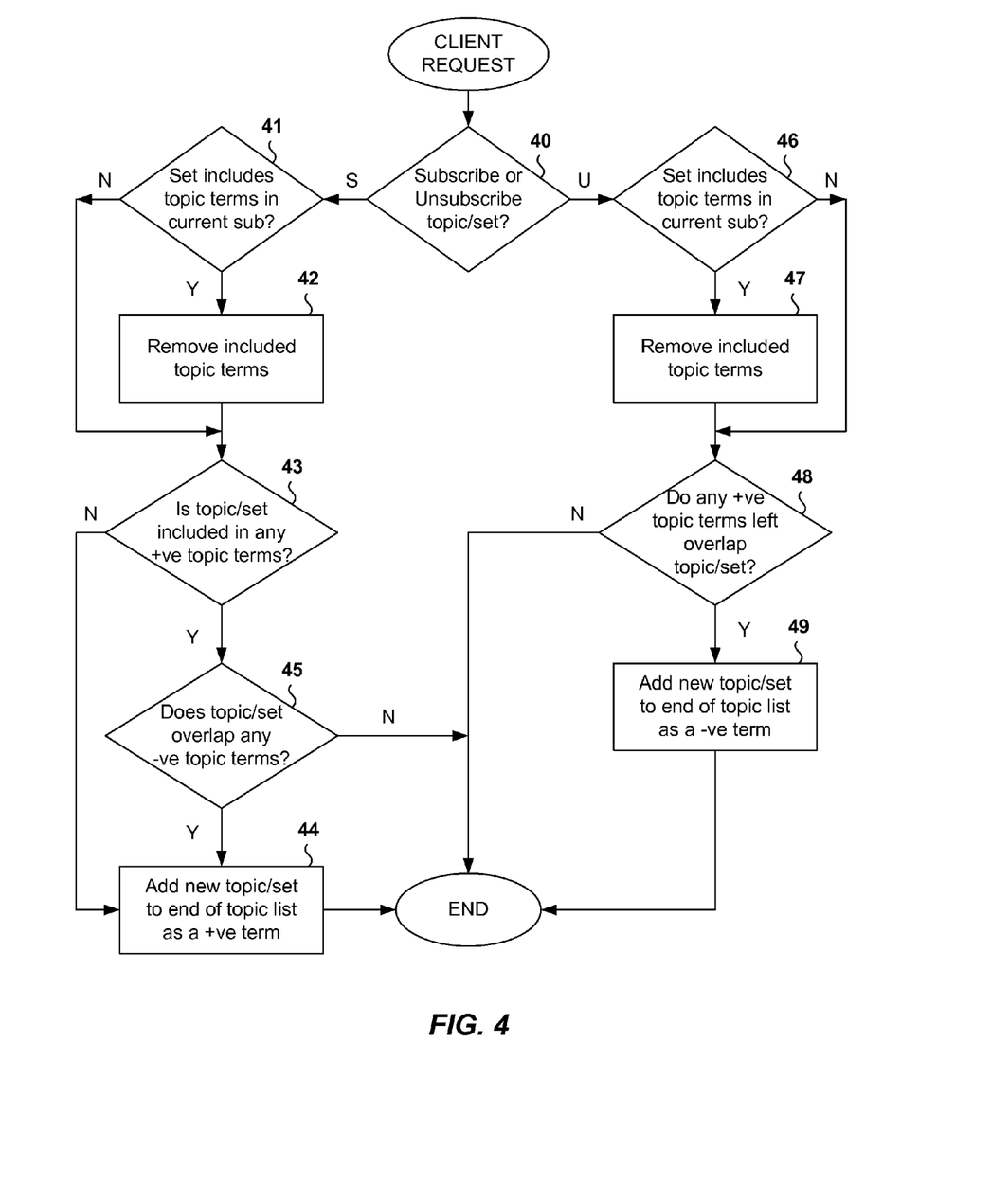
FIG. 4 is a flow diagram showing the generation and management of a subscription list in a method of brokering according to the present invention.
Figure 5:
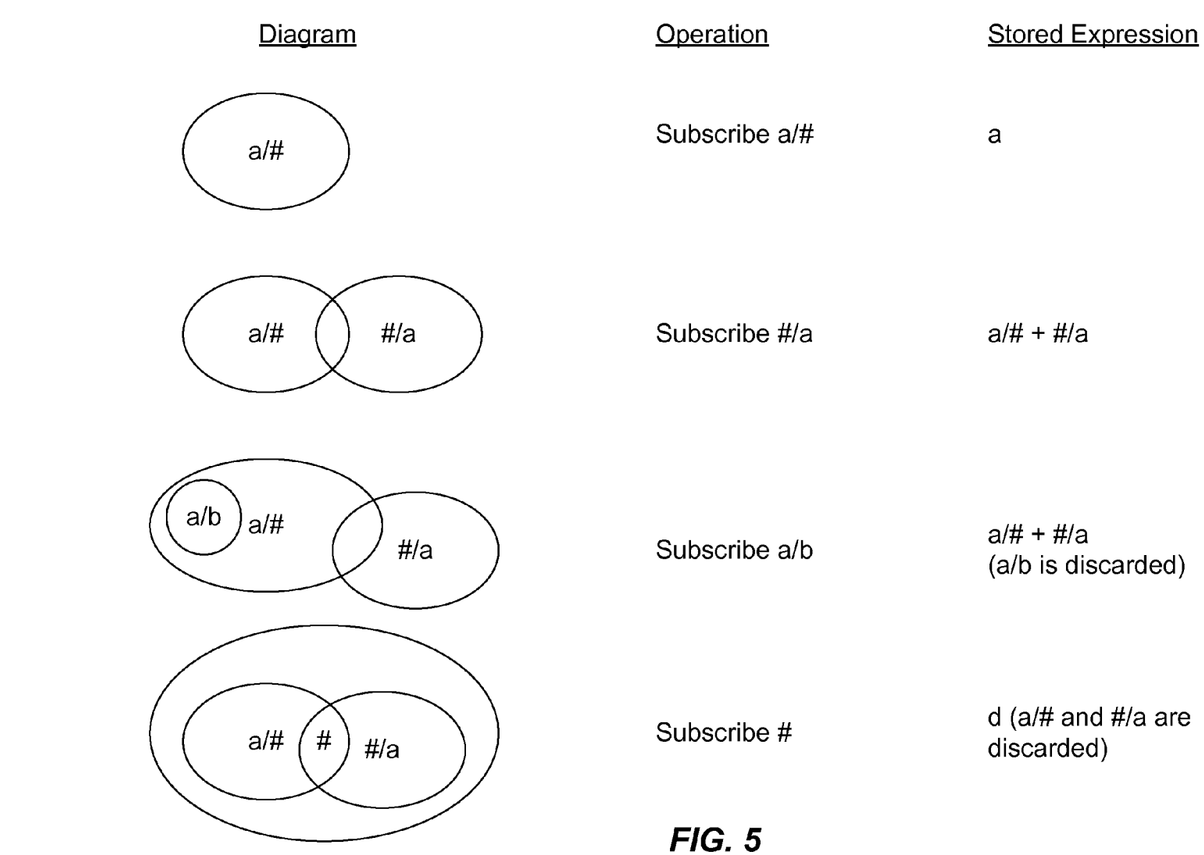
FIGS. 5 to 7 show examples of the operation of the method of FIG. 4.
Figure 6:
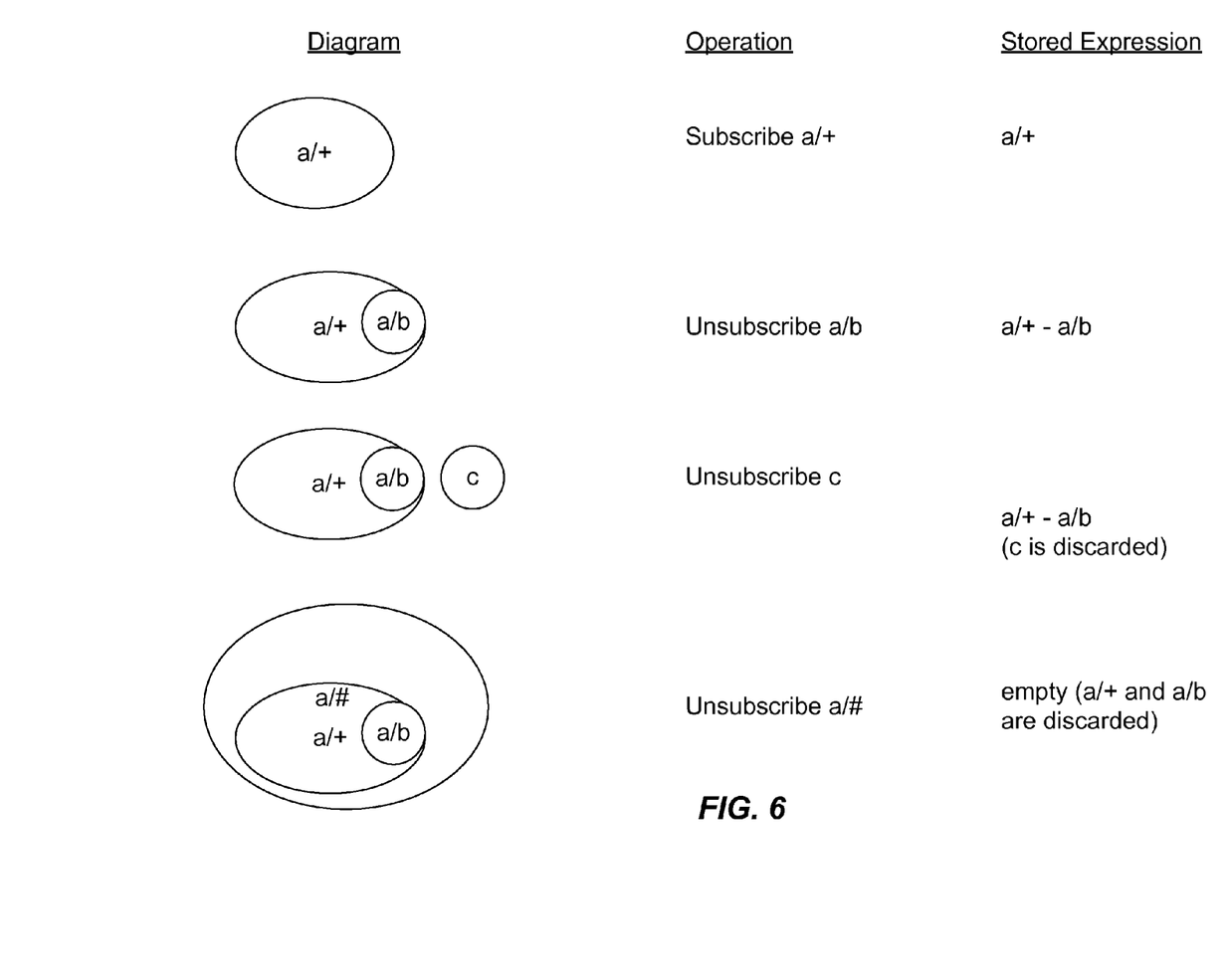
Figure 7:
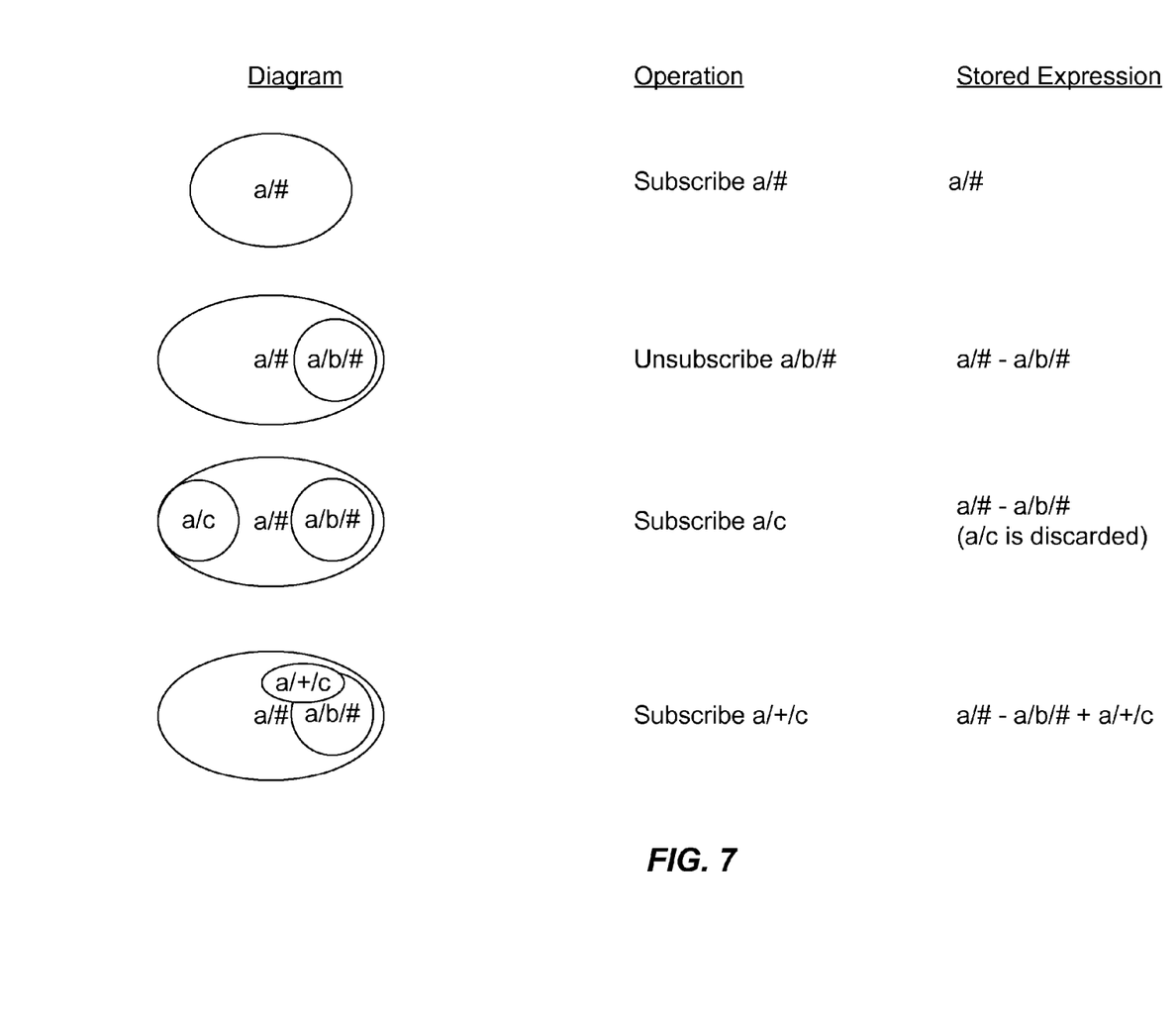
Figure 8:
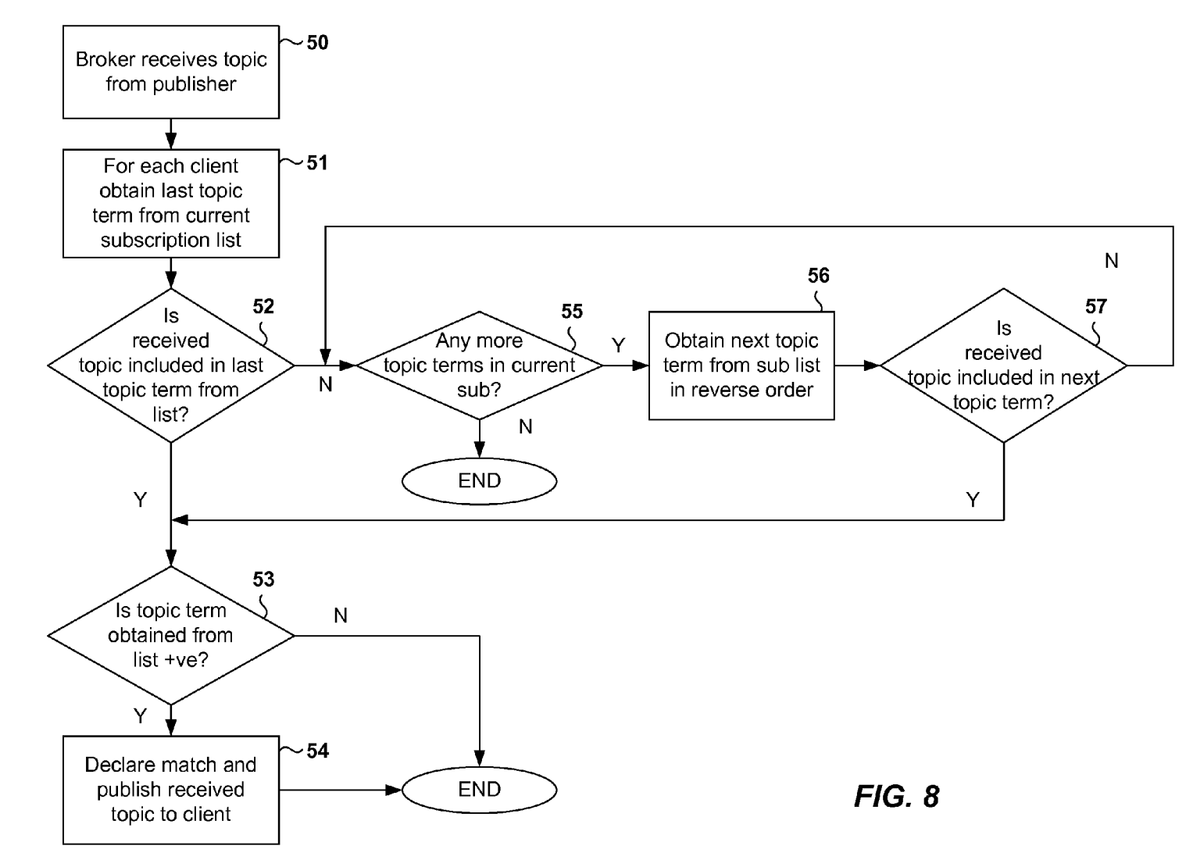
FIG. 8 is a flow diagram showing the handling of publications using topics in the system of FIG. 1 according to the subscription lists generated by the method of FIG. 4.

Turning now to the implementation of a method according to the invention, this is described in the flow diagrams of FIGS. 4 and 8, with examples of the results being shown in FIGS. 5, 6 and 7. Although the focus and principal benefits of the invention are in the partial unsubscribe function, the invention does offer some improvement in the handling of subscriptions as well. In both cases, it reduces redundancy in the subscription list, consequently improving the efficiency of handling both types of request. For this reason, both subscribe and unsubscribe operations are described in FIG. 4.

At the heart of the invention is the idea of a new type of subscription list which can contain both positive signed terms, corresponding to topic subscriptions, and negative terms, corresponding to unsubscriptions. The significance and use of this will become clearer as the description progresses but it is only necessary for the moment for the understanding of FIG. 4 to accept that both types may exist in a subscription list.

In the method of FIG. 4, the starting point is the receipt by generation software 16 (FIG. 1) of a request from the client. A determination is made in step 40 as to whether this is a request to subscribe to or unsubscribe from a topic or topic set. If the request is to subscribe, it is determined in step 41, if the topic is a set, whether it includes any existing topic terms in the current subscription (note that topic terms can be both positive and negative). If so, the existing topic terms are removed from the list in step 42. If the topic was not a set or the set did not include any existing topic terms, it is next determined in step 43 whether the topic or topic set to be subscribed to (added) is itself included in any positive topic terms. If not, the new topic or set is added, in step 44, to the end of the subscription list as a positive term. If, in step 43, the topic or topic set is determined to be included in any positive topic term but, in step 45 also to overlap any negative topic terms (by means of the function topicOverlaps(x,y)), it is also added to the end of the list as a positive term. In this way, as new subscriptions are added, redundancies in the subscription list are removed, leading to more efficient processing.

In summary, the effects of the subscribe action to add a new topic or set to the current subscription are (1) to remove any topic terms in the current subscription that are included in the topic set to be added and (2) if the topic set to be added is not included in any positive topic terms, or, if it is, but it overlaps any negative topic terms, to add it to the end of the topic list.

Turning now to the right hand side of FIG. 4, if the client request is to unsubscribe from a topic or topic set, as determined in step 40, it is first determined in step 46 if the topic or topic set includes any existing terms (positive or negative) in the current subscription list. If the answer is "yes" then, in step 47, the included topic terms are removed. Steps 46 and 47 are the same as steps 41 and 42 in effect and may be combined in actual program code but are shown separately here for ease of explanation.

However, if the result of test 46 is negative, that is the unsubscribe was for a discrete topic or for a topic set which does not include any existing topic term, a determination is made in step 48 as to whether the topic to be removed, if a set, overlaps any positive topic terms remaining in the subscription list. If not, the program ends without further action but, if so, the new unsubscribe topic set is added to the end of the list, in step 49, as a negative term. If the topic to be removed is a discrete topic, it cannot overlap any remaining positive topic term and the determination in step 48 is again negative. This produces no action, which is the correct result as there is no point in adding a negative term relating to a discrete topic unsubscription which was not the subject of any positive subscription in the first place.

In summary, the effect of the unsubscribe action to remove a topic or topic set from the current subscription is, firstly, to remove each topic term which is included in a topic set to remove and secondly, if any remaining positive topic term overlaps with the topic or topic set to remove, to add the new topic or topic set to the end of the topic list.

Three examples of the cumulative effects of various subscribe and unsubscribe operations carried out according to the method of FIG. 4 by the generating software 16 are shown in FIGS. 5, 6 and 7. The subscribe and unsubscribe actions are listed centrally, with the topics and topic sets shown as Venn diagrams to the left and the resulting stored expression (subscription list) on the right.

In FIG. 5, in line (i), an initial subscription to the topic set a/# is made. In line (ii), the set #/a is subscribed and added to the list. In lines (iii) a subscription to the topic a/b is made but as this is included in a/#, it is discarded and not added to the list. Finally, in line (iv), a subscription # (all topics) is made. This results in all the previously listed terms being discarded. Thus, any publication will immediately be matched with the all topics wildcard and distributed to the subscriber.

In FIG. 6, the initial subscription in line (i) is to the set a/+, which becomes the first topic in the list. The next action in line (ii) is to unsubscribe from the topic a/b which is a subset of a/+. The term "−a/b" is added to the list. In line (iii) a topic c is unsubscribed. As it is not included in or overlapping the current subscriptions, no existing subscription would have matched a publication of topic "c" anyway, so it is discarded.

Finally, in line (iv), the set a/# is unsubscribed. As this includes all current terms listed, the subscriber has effectively unsubscribed from everything and the terms "a/+" and "−a/b" are removed from the list, leaving it empty. In this case, no publications at all will be distributed to the subscriber of this subscription list.

In the final example of FIG. 7, the first subscription listed is again the set "a/#", as shown in line (i). In line (ii), the topic set "a/b/#" is unsubscribed. As this is wholly included in *a/#", it is added as a negative term to the list. In line (iii), a subscription is made to a topic "a/c" but, as that is wholly within the already subscribed set *a/#" and does not overlap the unsubscribed set "a/b/#", it can be discarded. This is because, if topic "a/C is published, it will match listed topic set "a/#" and will be distributed to the subscriber anyway. Finally, in line (iv), a subscription is made to the set "a/+/c". Although this is wholly within the subscribed set "a/t", it cannot be ignored as it overlaps the unsubscribed set "a/b/#". Therefore it is added to the end of the list as a positive term, which overrides the unsubscription, as will now be explained.

FIG. 8 illustrates the method carried out by the match software 18, in broker 10. The starting point is the receipt by the broker, in step 50, of a publication from one of the publishers, containing, as well as the actual information, the definition of the topic according to the established syntax. For each subscriber (client) to which the publisher has the authority to publish, the relevant subscription list is extracted and, in step 51, the last (most recently entered) topic term in the subscription list is obtained.

In step 52, it is determined if the received topic is included in the obtained last topic term from the list. If so, in step 53, it is determined if the obtained topic term is positive, that is, it represents a requested subscription. If so, there is a match and in step 54, the topic publication is published to the subscriber without further ado. The match program can now end. If the obtained topic term is negative, as determined by step 53, the topic of the publication has been unsubscribed and the program ends without publication to the subscriber.

If, in step 52, it was determined that the received topic was not included in the last topic term in the subscription list, it is necessary to continue the comparison with other terms in the list, if any. If there are none, as determined in step 55, the program simply ends without any publication taking place. If there are more terms in the list, the next to the last is obtained in step 56 and compared with the received topic in step 57. If the received topic is not included in the most recently-obtained term, the program loops back to step 55, with the effect that the terms are extracted and compared in reverse order. If, however, the most recent term does include the received topic, steps 53 and 54 are carried out to determine whether the received topic matches a positive term and should therefore be published, or not.

It will be seen that by checking for a match with both positive and negative topic terms in reverse order, a match with a negative term effectively prevents publication and overrides or bypasses the effect of a potential match with a broader positive term added earlier to the subscription list. The most recently added term in the list has the highest priority and is acted upon first to determine whether a received topic is to be published or not. An example of this can be seen in FIG. 7, where the last subscription "+a/+/c" takes precedence over the unsubscription "−a/b/#" which itself takes precedence over the subscription "a/#" (positive sign implied).

Thus the system and method of FIGS. 1, 4 and 8 allow partial unsubscription from a previously subscribed topic set and further optimises the subscription list as both new subscriptions and unsubscriptions are requested.

The invention claimed is:

1. A method for managing subscriptions to topics and topic sets in a publish/subscribe system, comprising:
   in response to a subscribe request for a subscriber,
      identifying a first topic or topic set, and
      storing, as a positive subscription, an identifier of the first topic or topic set;
   in response to an unsubscribe request for the subscriber, the unsubscribe request identifying a second topic or topic set that partially overlaps the identified first topic or topic set,
      storing, as a negative subscription, an identifier of the second topic or topic set; and
   identifying which received publications to forward to the subscriber by comparing topics of the received publications with stored identifiers of topics and topic sets of both the positive subscription and the negative subscription.

2. The method of claim 1, wherein
more recently stored identifiers take precedence over less recently stored identifiers.

3. The method of claim 2, wherein
identifiers of topics and topic sets are stored in an order in which the subscribe and unsubscribe requests are received,
topics of received publications are compared with the stored identifiers of the topics and topic sets in a sequence which is reverse of a sequence in which the stored identifiers of the topics and topic sets were stored, and
any topics identified within positive subscriptions that are cancelled by more recently stored negative subscriptions are disregarded.

4. The method of claim 1, further comprising
in response to a second unsubscribe request for the subscriber and upon identifying a topic or topic set of a positive subscription that is included in a newly unsubscribed topic set,
   removing a corresponding topic identifier of the identified topic or topic set from the stored topic identifiers.

5. The method of claim 1, further comprising
the storing, as the negative subscription, the identifier of the second topic set is only performed upon the second topic set including a subset of the topic set of the positive subscription.

6. The method of claim 1, further comprising
in response to a request from the subscriber to subscribe to a topic set and upon identifying a stored topic identifier of a current positive subscription that is included in a newly subscribed topic set,
replacing the stored topic identifier with an identifier of the topic set.

7. The method of claim 1, further comprising
in response to a request from the subscriber to subscribe to a topic or topic set and upon
   the topic or topic set not already identified in a stored positive subscription, or
   the requested topic or topic set overlapping a topic or topic set of a stored negative subscription,
adding an identifier of the topic or topic set to stored positive subscriptions.

8. A message broker for brokering published information and subscriber requests in a publish/subscribe system, comprising:
   a computer hardware device configured to
      in response to a subscribe request for a subscriber,
         identifying a first topic or topic set, and
         storing, as a positive subscription, an identifier of the first topic or topic set;
      in response to an unsubscribe request for the subscriber, the unsubscribe request identifying a second topic or topic set that partially overlaps the identified first topic or topic set,
         storing, as a negative subscription, an identifier of the second topic or topic set; and
      identifying which received publications to forward to the subscriber by comparing topics of the received publications with stored identifiers of topics and topic sets of both the positive subscription and the negative subscription.

9. The message broker of claim 8, wherein
more recently stored identifiers take precedence over less recently stored identifiers.

10. The message broker of claim 9, wherein
identifiers of topics and topic sets are stored in an order in which the subscribe and unsubscribe requests are received,
topics of received publications are compared with the stored identifiers of the topics and topic sets in a sequence which is reverse of a sequence in which the stored identifiers of the topics and topic sets were stored, and
any topics identified within positive subscriptions that are cancelled by more recently stored negative subscriptions are disregarded.

11. The message broker of claim 8, wherein the computer hardware device is further configured to
in response to a second unsubscribe request for the subscriber and upon identifying a topic or topic set of a positive subscription that is included in a newly unsubscribed topic set,
   removing a corresponding topic identifier of the identified topic or topic set from the stored topic identifiers.

12. The message broker of claim 8, wherein the computer hardware device is further configured to
the storing, as the negative subscription, the identifier of the second topic set is only performed upon the second topic set including a subset of the topic set of the positive subscription.

13. The message broker of claim 8, wherein the computer hardware device is further configured to
in response to a request from the subscriber to subscribe to a topic set and upon identifying a stored topic identifier of a current positive subscription that is included in a newly subscribed topic set,
   replacing the stored topic identifier with an identifier of the topic set.

14. The message broker of claim 8, wherein the computer hardware device is further configured to
in response to a request from the subscriber to subscribe to a topic or topic set and upon
   the topic or topic set not already identified in a stored positive subscription, or the requested topic or topic set overlapping a topic or topic set of a stored negative subscription, adding an identifier of the topic or topic set to stored positive subscriptions.

15. A computer program product, comprising:

computer usable storage media having stored thereon computer usable program code for managing subscriptions to topics and topic sets in a publish/subscribe system, the computer usable program code, which when executed by a computer hardware device, causes the computer hardware device to perform:

in response to a subscribe request for a subscriber,
identifying a first topic or topic set, and
storing, as a positive subscription, an identifier of the first topic or topic set;

in response to an unsubscribe request for the subscriber, the unsubscribe request identifying a second topic or topic set that partially overlaps the identified first topic or topic set,
storing, as a negative subscription, an identifier of the second topic or topic set; and identifying which received publications to forward to the subscriber by comparing topics of the received publications with stored identifiers of topics and topic sets of both the positive subscription and the negative subscription, wherein the computer usable storage media is not a transitory, propagating signal per se.

16. The computer program product of claim 15, wherein more recently stored identifiers take precedence over less recently stored identifiers.

17. The computer program product of claim 16, wherein identifiers of topics and topic sets are stored in an order in which the subscribe and unsubscribe requests are received, topics of received publications are compared with the stored identifiers of the topics and topic sets in a sequence which is reverse of a sequence in which the stored identifiers of the topics and topic sets were stored, and any topics identified within positive subscriptions that are cancelled by more recently stored negative subscriptions are disregarded.

18. The computer program product of claim 15, wherein the computer usable program code further causes the computer hardware device to perform in response to a second unsubscribe request for the subscriber and upon identifying a topic or topic set of a positive subscription that is included in a newly unsubscribed topic set, removing a corresponding topic identifier of the identified topic or topic set from the stored topic identifiers.

19. The computer program product of claim 15, wherein the computer usable program code further causes the computer hardware device to perform the storing, as the negative subscription, the identifier of the second topic set is only performed upon the second topic set including a subset of the topic set of the positive subscription.

20. The computer program product of claim 15, wherein the computer usable program code further causes the computer hardware device to perform in response to a request from the subscriber to subscribe to a topic set and upon identifying a stored topic identifier of a current positive subscription that is included in a newly subscribed topic set, replacing the stored topic identifier with an identifier of the topic set.

21. The computer program product of claim 15, wherein the computer usable program code further causes the computer hardware device to perform in response to a request from the subscriber to subscribe to a topic or topic set and upon
the topic or topic set not already identified in a stored positive subscription, or
the requested topic or topic set overlapping a topic or topic set of a stored negative subscription, adding an identifier of the topic or topic set to stored positive subscriptions.

* * * * *